United States Patent Office 3,437,660
Patented Apr. 8, 1969

3,437,660
PRODUCTION OF METHYL-ACETYL-PIMELOGUANAMINE
Pasquale J. Apice, Cresskill, N.J., assignor to Allied Chemical Corporation, New York, N.Y., a corporation of New York
No Drawing. Filed Mar. 28, 1967, Ser. No. 626,382
Int. Cl. C07d 55/20; C08g 9/24
U.S. Cl. 260—249.9    9 Claims

ABSTRACT OF THE DISCLOSURE

A process is provided for producing gamma-methyl-gamma-acetylpimeloguanamine (MAPG), which, when reacted with formaldehyde, produces resins having improved freedom from color. Cyanoguanidine and gamma-methyl-gamma-acetylpimelonitrile are heat-reacted at a temperature maintained below 100° C. in the presence of a strong base and an alcoholic solvent comprising at least 50% lower alkoxyalkanol.

---

It is known from U.S. Patent 2,684,366 that guanamines can be prepared by reacting nitriles with cyanoguanidines at a temperature from about 100° to 210° C. in the presence of a strong base and an alcoholic solvent, the preferred alcoholic solvent being one whose boiling point is in the range of 100° to 210° C. This patent specifically discloses the preparation of MAPG by reacting gamma-methyl-gamma-acetylpimelonitrile with dicyandiamide in benzyl alcohol at 130° to 160° C.

It is known from U.S. Patent 2,665,260 that diguanamines can be reacted with formaldehyde to form thermosetting resins having superior flexibility and toughness. It has been found that of all the diguanamines, MAPG is particularly well suited for the preparation of resins and that the resins so prepared have very desirable properties, including stain resistance. However, while the resins formed using MAPG of the prior art are substantially colorless, they do not possess such a high degree of colorlessness as to be well suited for the manufacture of very white objects such as dinnerware.

In view of the foregoing, it is an object of the present invention to provide a process for producing MAPG which, when reacted with formaldehyde, will produce a resin having a very high degree of colorlessness.

Other objects and advantages of the present invention will be apparent from the following description.

In accordance with the present invention, MAPG is prepared by reacting cyanoguanidine with gamma-methyl-gamma-acetylpimelonitrile at elevated temperatures below 100° C. in the presence of a strong base and an alcoholic solvent comprising at least 50% by volume lower alkoxyalkanol.

The minimum temperature is not critical. However, temperatures of at least about 75° C. should be used in order to achieve a satisfactorily high reaction rate. Temperatures above 85° C. are preferred.

At least 2 mols, and preferably 2.2 to 2.6 mols, of cyanoguanidine are used for each mol of gamma-methyl-gamma-acetylpimelonitrile.

The lower alkoxyalkanol, which must comprise at least 50% of the solvent, shall be one in which the alkoxy group contains 1 to 4 carbon atoms and the alkanol group contains 2 or 3 carbon atoms. The solvent can consist entirely of one or a mixture of alkoxyalkanols, or it can comprise 50% or more of alkoxyalkanol with the remainder being an aliphatic alcohol containing 1 to 8 carbon atoms, such as methanol, 2-butanol, or n-octanol. The preferred solvent systems of the present invention are those which consist entirely of methoxyethanol and those which comprise at least 50% methoxyethanol with the remainder being methanol.

Since the reaction is at least partially exothermic, it is necessary to provide suitable cooling means when the particular solvent system used boils at 100° C. or above.

The amount of solvent is generally about 1.5 to 4 times the total weight of the other ingredients. However, a little more or less can be used, depending on the ability to dissolve the reactants at the temperatures employed.

The strong base may be any of those which are generally recognized as useful in the preparation of guanamines by reacting nitriles with guanidines. Examples are potassium hydroxide, sodium hydroxide, potassium carbonate, sodium methoxide, sodium ethoxide, benzyltrimethyl ammonium hydroxide and sodium or potassium dicyandiamide. The amount of strong base is not critical, but amounts in excess of about 20% by weight of the nitrile merely increase cost without compensating benefit. Amounts in the range of about 8 to about 15% by weight of the nitrile are preferred.

As already pointed out, resins formed from MAPG prepared in accordance with the prior art, though almost free from color, have been found to have an APHA (American Public Health Authority) hazen color ranging from 66 to well above 100. Such hazen values are considered unsuitable for preparing very white molded articles.

I have found that only by using one of the selected solvent systems described above, in conjunction with temperatures carefully maintained below 100° C., can MAPG be prepared from which can be made MAPG-formaldehyde resins having APHA color values below 55. As will be seen hereinafter, when either of these conditions is not observed, resins prepared from the resulting products have APHA hazen color values above 60 and quite often have 100. Under the preferred conditions of the present invention, i.e., a solvent system comprising at least 50% by volume methoxyethanol, outstanding APHA color values below 40, are achieved.

The preparation of MAPG-formaldehyde resins does not constitute part of the present invention, but merely provides a practical method of determining the colorlessness of the MAPG prepared in accordance with the processes of the invention. In the examples which follow, the same procedure was used in preparing each of the MAPG-formaldehyde resins for color testing.

MAPG—formaldehyde resins preparation

A solution of 50.7 gm. of 37% formaldehyde and 24.5 gm. distilled water is adjusted to pH 8.5 with 10% NaOH, placed in a 250 ml. resin kettle and heated with stirring to about 80–90° C. Thirty-five grams MAPG crystals are added portion-wise over 10–15 minutes and heating is continued for an additional 20 minutes at 90–95° C. The resulting resin solution is cooled to 70° C., adjusted to pH 8.5–8.8 with 10% NaOH and filtered hot through a Buchner funnel containing about ⅜ inch damp "Celite 545" diatomaceous earth filter-aid bed. ("Celite" is a registered trademark.)

The APHA hazen color value of the resulting resin solutions is determined as follows:

(1) Giving distilled water a value of 100% and using a Fisher Electrophotometer fitted with a 425B filter and 23 ml. round cells, the percent light transmission of several standard solutions prepared in accordance with ASTM D1209–62 are determined and plotted.

(2) Using the same equipment, the percent light transmission of the resin solution is determined.

(3) The percent light transmission of step (2) is converted to the corresponding hazen color value plotted in step (1).

The following examples illustrate the best known methods of carrying out the present invention.

EXAMPLE 1

To a 1-liter reaction kettle are charged 84 grams gamma-methyl-gamma-acetylpimelonitrile, 90 grams cyanoguanidine, 15 grams 85% potassium hydroxide pellets and 365 milliliters methoxyethanol. The charge is immediately blanked with nitrogen, agitated and heated to 90 to 95° C. for four hours. The resulting material is cooled to 30° C. and filtered through a large, medium porosity frittered glass Buchner funnel. The filter cake is washed with at least twenty 100-milliliter portions of hot (75° C.) water without being allowed to dry or crack. The cake is then sucked dry as possible and dried at 110° C. to constant weight.

A MAPG-formaldehyde resin solution is prepared as described above. The APHA hazen color of the resin solution is 35 corresponding to a percent light transmission of 93.5%.

EXAMPLE 2

Example 1 is repeated except that 10 grams potassium hydroxide pellets are used, the reaction temperature is 95–98° C., and the solvent comprises 80% by volume methoxyethanol and 20% methanol. The MAPG-formaldehyde resin prepared from the resulting product has an APHA hazen color of 38, corresponding to a percent light transmission of 93.0%.

EXAMPLE 3

Example 1 is repeated except that the amount of KOH is 10 grams. The yield of MAPG is 60.0%. The APHA hazen color of the MAPG-formaldehyde resin prepared from this product is 29, corresponding to a percent light transmission of 94.5%.

EXAMPLE 4

To a 1-liter reaction kettle are charged 84 grams gamma-methyl-gamma-acetylpimelonitrile, 90 grams cyanoguanidine, 10 grams 85% KOH pellets and 442 milliliters of a solvent comprising 80% by volume 2-ethoxyethanol and 20% methanol. The resulting mixture is heated at 92° C. for 22 hours. The yield of MAPG is 80.7%. The APHA hazen color of the MAPG-formaldehyde resin solution prepared therefrom is 48, corresponding to a percent light transmission of 91.5%.

EXAMPLE 5

Example 4 is repeated, except that the solvent is a mixture of 75% by volume ethoxyethanol and 25% 2-butanol and the reaction time and temperature are 18 hours and 94° C., respectively. The yield of MAPG is 84%. The APHA hazen color of the resin solution prepared therefrom is 51, corresponding to a percent light transmission of 91%.

EXAMPLE 6

The procedure of Example 4 is repeated except that the solvent is a mixture of 80% by volume methoxyethanol and 20% n-octanol and the reaction temperature is 90° C. The yield of MAPG is 84.0%. The APHA hazen color of the resin solution prepared therefrom is 51, corresponding to a percent light transmission of 91.0%.

EXAMPLE 7

The procedure of Example 4 is followed, except that the solvent is 1-methoxy-2-propanol and the reaction time and temperature are 19 hours and 94° C. respectively. The yield of MAPG is 82.5%. The APHA hazen color of the resin solution prepared therefrom is 51, corresponding to a percent light transmission of 91%.

In the following tabulated examples, the procedure of Example 1 was followed, except for the indicated variations. As can be seen from this table, when either the solvent, the reaction temperature or both do not correspond to the conditions required for the present invention, the APHA hazen color is substantially above 55.

TABLE I

| Solvent System | KOH, gm. | Reaction Time, hrs. | Reaction Temp., °C. | Yield, Percent | APHA Hazen Color |
|---|---|---|---|---|---|
| A | 10 | 3 | 100–110 | 18.5 | 88 |
| B | 10 | 2 | 115–125 | 80.6 | 63 |
| C Isopropanol | 10 | 6 | 83 | 63.5 | 130+ |
| D Benzyl alcohol (442 ml.) | 10 | 21 | | 77.3 | 103+ |
| E Ethanol (639 ml. under pressure) | 10 | 20 | | 38.0 | 130+ |
| F Methanol (639 ml. under pressure) | 10 | 23 | | 52.0 | 112 |
| G Propylene glycol (442 ml.) | 10 | 24 | | 40.0 | 110 |
| H n-Octanol (639 ml.) | 10 | 21 | | 62.0 | 130+ |

I claim:

1. In the process for producing gamma-methyl-gamma-acetylpimeloguanamine by reacting gamma-methyl-gamma-acetylpimelonitrile with cyanoguanidine at elevated temperatures in the presence of a strong base and an alcoholic solvent, the improvement which comprises maintaining the temperature below 100° C. and using a solvent which comprises at least 50% by volume lower alkoxyethanol, lower alkoxypropanol or mixtures thereof.

2. The process of claim 1, wherein the alkoxy group contains 1 to 4 carbon atoms.

3. The process of claim 2, wherein the temperature is at least 85° C.

4. The process of claim 2, wherein the remainder of the solvent is an alcohol containing 1 to 8 carbon atoms.

5. The process of claim 2, wherein the amount of strong base is less than 20% by weight of the gamma-methyl-gamma-acetylpimelonitrile.

6. The process of claim 2, wherein the strong base is KOH.

7. The process of claim 2, wherein the solvent comprises at least 50% beta-methoxyethanol.

8. The process of claim 2, wherein the alcoholic solvent consists entirely of beta-methoxyethanol.

9. The process of claim 4, wherein the remainder of the solvent is methanol.

References Cited

UNITED STATES PATENTS 2,510,761   6/1950   Simons _____ 260—249.9
2,665,260   1/1954   Simons _____ 260—249.9 XR HENRY R. JILES, *Primary Examiner.*

J. M. FORD, *Assistant Examiner.*

U.S. Cl. X.R.

260—67.7